United States Patent
Wu (10) Patent No.: US 11,347,586 B2
(45) Date of Patent: May 31, 2022

(54) REALIZING HIGH-SPEED AND LOW-LATENCY RAID ACROSS MULTIPLE SOLID-STATE STORAGE DEVICE WITH HOST-SIDE FTL

(71) Applicant: ScaleFlux, Inc., San Jose, CA (US)

(72) Inventor: Qi Wu, San Jose, CA (US)

(73) Assignee: SCALEFLUX, INC., San Jose, CA (US)

( * ) Notice: Subject to any disclaimer, the term of this patent is extended or adjusted under 35 U.S.C. 154(b) by 530 days.

(21) Appl. No.: 16/521,703

(22) Filed: Jul. 25, 2019

(65) Prior Publication Data

US 2020/0034234 A1   Jan. 30, 2020

Related U.S. Application Data

(60) Provisional application No. 62/703,271, filed on Jul. 25, 2018.

(51) Int. Cl.
*G06F 12/10* (2016.01)
*G06F 11/10* (2006.01)

(52) U.S. Cl.
CPC .......... *G06F 11/1076* (2013.01); *G06F 12/10* (2013.01); *G06F 2212/7201* (2013.01)

(58) Field of Classification Search
CPC ................. G06F 11/1076; G06F 12/10; G06F 2212/7201
USPC ........................................ 714/6.2, 6.24, 6.3
See application file for complete search history.

(56) References Cited

U.S. PATENT DOCUMENTS

| | | | |
|---|---|---|---|
| 8,700,949 B2* | 4/2014 | Eleftheriou | G06F 12/0246 711/113 |
| 2015/0310916 A1* | 10/2015 | Leem | G11C 7/109 711/105 |
| 2016/0041904 A1* | 2/2016 | Bhattacharya | G06F 16/1847 711/103 |
| 2019/0171522 A1* | 6/2019 | Chang | G06F 12/1009 |
| 2021/0103517 A1* | 4/2021 | Kim | G06F 12/0246 |

* cited by examiner

*Primary Examiner* — Chae M Ko
(74) *Attorney, Agent, or Firm* — Hoffman Warnick LLC (57) ABSTRACT

A method for implementing a RAID group in a system including a host computing system, a first set of storage devices for storing user data for the RAID group, and a second set of storage devices for storing redundancy data for the RAID group. The method includes: distributing the user data from a host-side FLT module on the host computing system to the first set of storage devices; determining, by each storage device in the first set of storage devices, a logical block address to physical block address (LBA-PBA) binding for the user data received from the host-side FLT module; sending LBA-PBA binding information for the LBA-PBA binding from the first set of storage devices to the host-side FLT module; and performing, by the host-side FLT module, RAID encoding to form the RAID group based on the LBA-PBA binding information received from the first set of storage devices.

20 Claims, 6 Drawing Sheets

REALIZING HIGH-SPEED AND LOW-LATENCY RAID ACROSS MULTIPLE SOLID-STATE STORAGE DEVICE WITH HOST-SIDE FTL

TECHNICAL FIELD

The present disclosure relates to the field of solid-state data storage, and more particularly to efficiently implementing RAID (redundant array of independent disks) across multiple solid-state storage devices.

BACKGROUND

RAID has been pervasively used to improve the data storage reliability of an array of data storage devices (e.g., solid-state data storage devices, magnetic recording hard disk drives, etc.). Given a total m+r storage devices, RAID encodes each group of m data chunks to generate r redundancy chunks, providing one RAID group consisting of m+r chunks. All the chunks have the exactly same size. Each chunk in one RAID group is stored in one distinct data storage device. The RAID can tolerate up to r storage device failures without losing data.

In conventional design practice, computing systems deploy RAID over a plurality of solid-state data storage devices, where each solid-state data storage device internally implements all the flash memory management functions with complete transparency to the host. As a result, the formation of each RAID group is based on the logical block address (LBAs) of the data. Moreover, in order to reduce the cost, many computing systems implement software-based RAID (i.e., the RAID encoding and management of RAID groups are all handled by the host CPUs) instead of using a dedicated RAID controller chip/card. However, current practice of software-based RAID on solid-state data storage devices can be subject to throughput and latency penalties for at least the following reasons: (1) Modification of any data inside one RAID group invokes the recalculation and storage of the redundancy chunks r in the RAID group, leading to additional data read and write activities on NAND flash memory. The additional NAND flash memory read/write activities inevitably interfere with normal I/O requests and hence degrade the storage system speed and latency performance. (2) In current practice, the host software first calculates the redundancy chunks r to form one complete RAID group, then writes the entire RAID group to the underlying storage devices. This leads to additional data write latency penalties.

SUMMARY

Accordingly, embodiments of the present disclosure are directed to methods for efficiently implementing RAID across multiple solid-state storage devices.

A first aspect of the disclosure is directed to a method for implementing a redundant array of independent disks (RAID) group in a system including a host computing system, a first set of storage devices for storing user data for the RAID group, and a second set of storage devices for storing redundancy data for the RAID group. The method includes: distributing the user data from a host-side flash translation layer (FLT) module on the host computing system to the first set of storage devices; determining, by each storage device in the first set of storage devices, a logical block address to physical block address (LBA-PBA) binding for the user data received from the host-side FLT module; sending LBA-PBA binding information for the LBA-PBA binding from the first set of storage devices to the host-side FLT module; and performing, by the host-side FLT module, RAID encoding to form the RAID group based on the LBA-PBA binding information received from the first set of storage devices.

A second aspect of the disclosure is directed to a system for implementing a redundant array of independent disks (RAID) group. The system includes: a host-side flash translation layer (FLT) module on a host computing system; a first set of storage devices for storing user data for the RAID group; and a second set of storage devices for storing redundancy data for the RAID group; wherein the host-side FTL module is configured to: distribute the user data to the first set of storage devices; receive a logical block address to physical block address (LBA-PBA) binding for the user data determined by the first set of storage devices; and perform RAID encoding to form the RAID group based on the LBA-PBA binding information received from the first set of storage devices.

A third aspect of the disclosure is directed to a system for implementing a redundant array of independent disks (RAID) group. The system includes: a host computing system; a flash translation layer (FLT) module on the host computing system; a first set of solid-state data storage devices for storing user data for the RAID group; and a second set of solid-state data storage devices for storing redundancy data for the RAID group; wherein the FTL module is configured to: distribute the user data to the first set of solid-state data storage devices; receive a logical block address to physical block address (LBA-PBA) binding for the user data from, and determined by, each solid-state data storage device in the first set of solid-state data storage devices; and perform RAID encoding to form the RAID group based on the LBA-PBA binding information received from each solid-state data storage device in the first set of solid-state data storage devices.

BRIEF DESCRIPTION OF THE DRAWINGS

The numerous advantages of the present disclosure may be better understood by those skilled in the art by reference to the accompanying figures.

The drawings are intended to depict only typical aspects of the disclosure, and therefore should not be considered as limiting the scope of the disclosure. In the drawings, like numbering represents like elements between the drawings.

DETAILED DESCRIPTION

Reference will now be made in detail to embodiments of the disclosure, examples of which are illustrated in the accompanying drawings.

In order to enable the most efficient implementation of RAID over multiple solid-state data storage devices, the present disclosure migrates flash translation layer (FTL) functions from each solid-state data storage device to the host (e.g., a host computing system) coupled to the solid-state data storage devices. The FTL is mainly responsible for handling the mapping between logical block addresses (LBAs) and physical block addresses (PBAs). In conventional practice using currently available solid-state data storage devices, the solid-state data storage devices internally store and manage the PBA and LBA-PBA mapping information with complete transparency to the host. To this extent, the host can only manage a RAID in the LBA domain, i.e., the host keeps the track of the LBAs of all the data sectors that form one RAID group. This, however, may cause significant read and write overhead in the case of data sector overwrite and modification.

Figure 1:
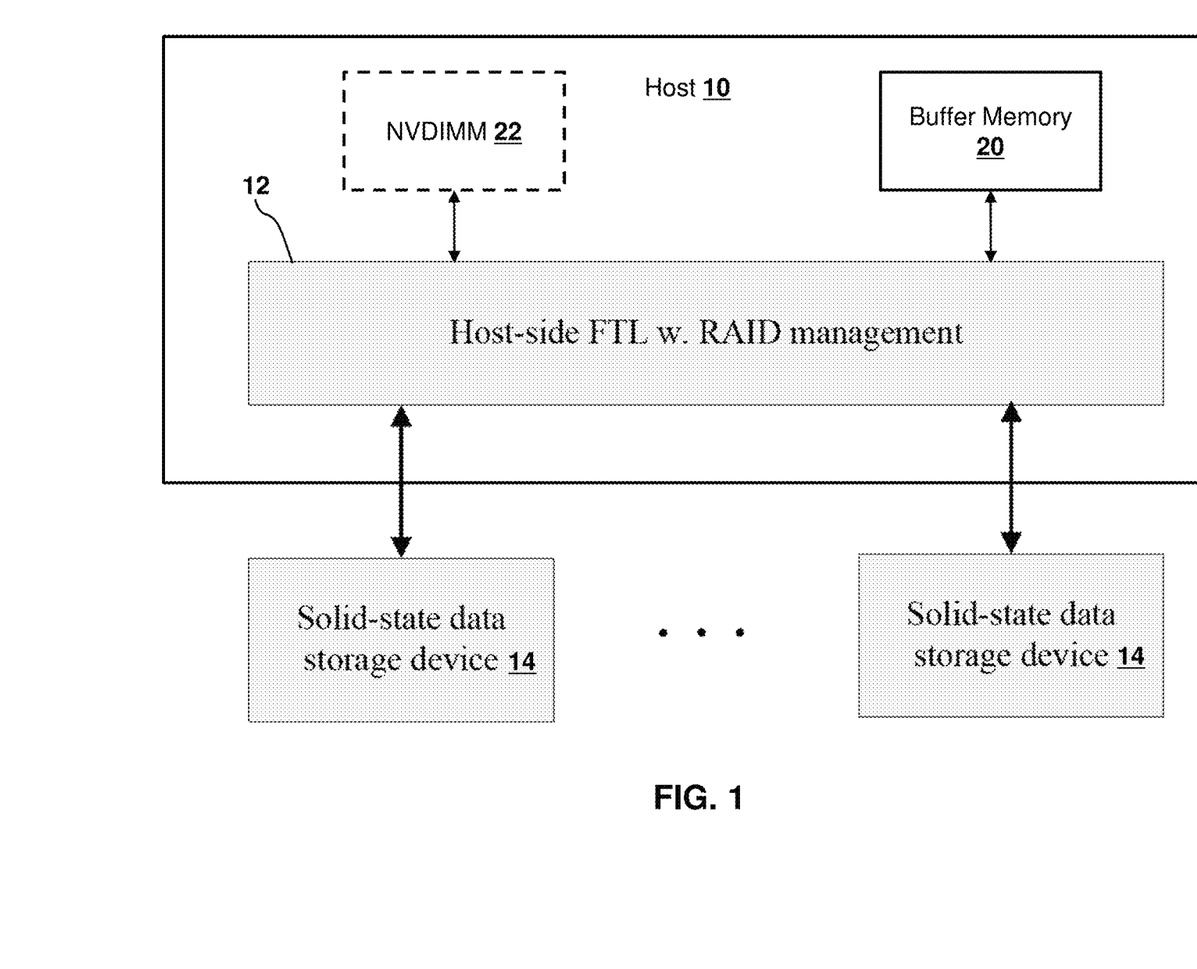
FIG. 1 illustrates the use of a host-side flash translation layer (FTL) to manage a RAID including multiple solid-state data storage devices according to embodiments.

As illustrated in FIG. 1, according to embodiments, a host 10 includes a host-side FTL module 12 that is responsible for cohesively managing the LBA-PBA mapping in the solid-state data storage devices 14 (also referred to herein as storage devices 14). The solid-state data storage devices 14 may include, for example, NAND flash memory. RAID encoding is carried out by the host-side FTL module 12 to generate the redundancy chunks r for each RAID group. The host-side FTL module 12 is also responsible for RAID decoding.

Figure 2:
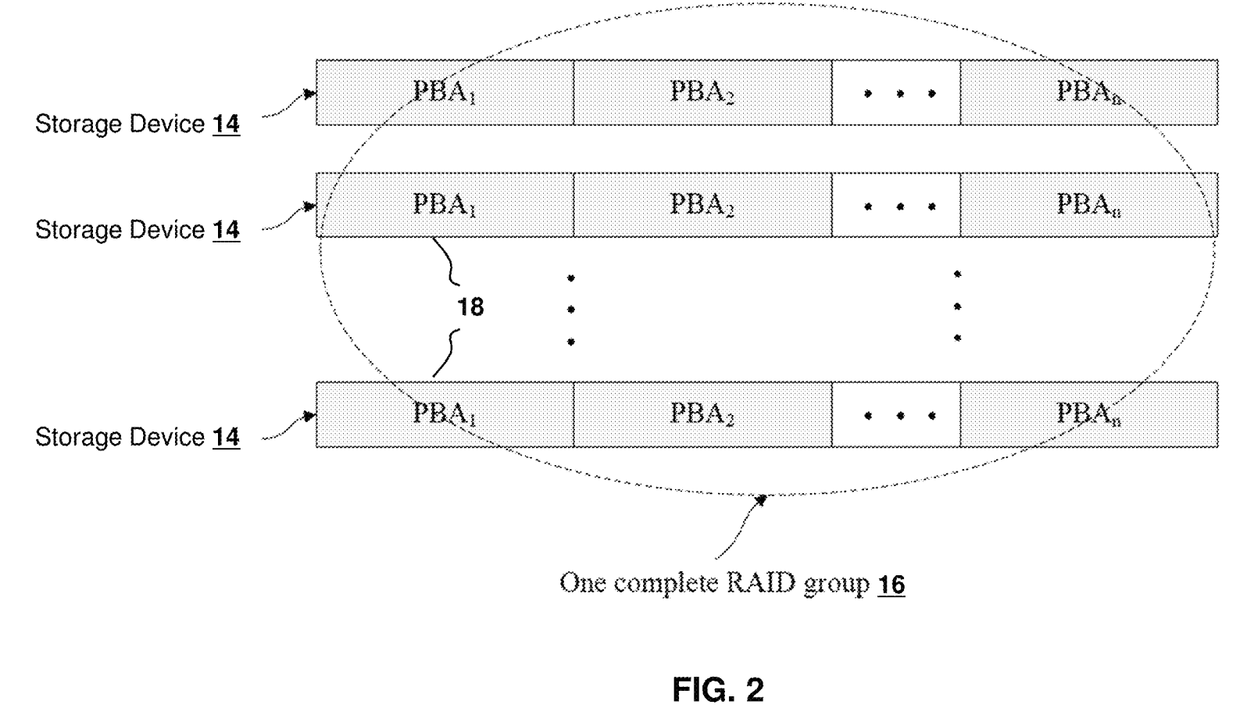
FIG. 2 illustrates physical block address (PBA)-based RAID group formation according to embodiments.

As illustrated in FIG. 2, to facilitate RAID group management, each RAID group 16 occupies the same PBAs 18 inside all the storage devices 14. Hence, the RAID group management provided by the host 10 is realized in the PBA domain, i.e., the data being stored at the same PBAs 18 in different storage devices 14 form a complete RAID group 16.

Suppose each RAID group 16 contains m+r chunks, including m user data chunks and r redundancy chunks. There are m+r storage devices 14, and each data chunk is stored over n contiguous PBAs 18 in one storage device 14. As illustrated in FIG. 2, the n contiguous PBAs 18 occupied by each data chunk are identical within one RAID group 16.

Figure 3:
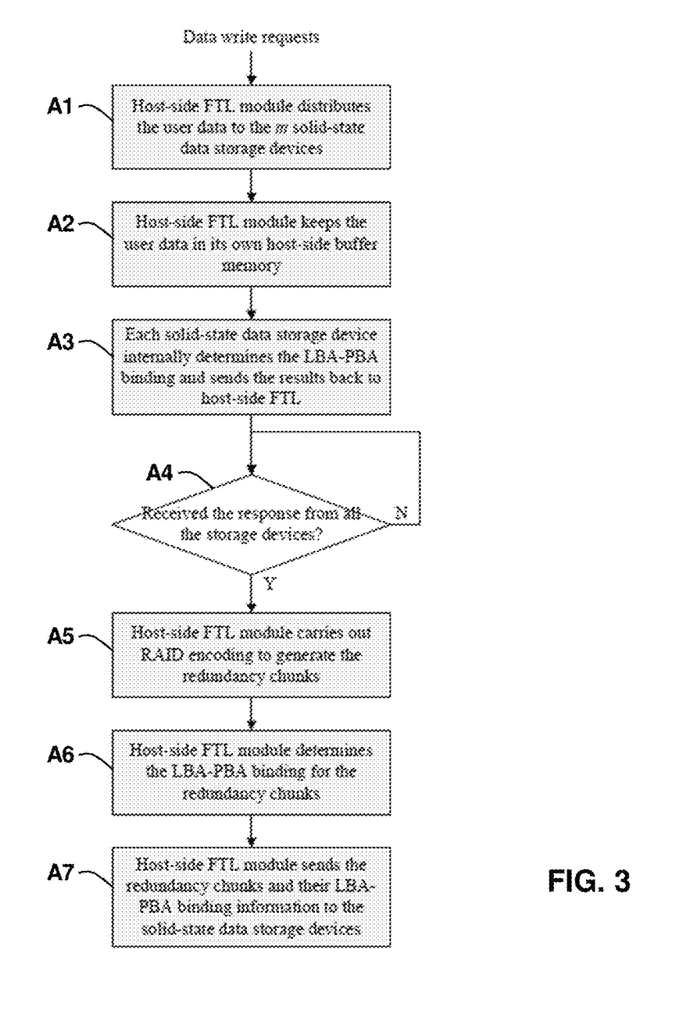
FIG. 3 illustrates an operational flow diagram of a process for host-side FTL-based RAID management with hardware-assisted logical block address (LBA)-PBA binding and RAID group formation according to embodiments.

In order to streamline the formation of RAID groups 16 and improve the write throughput of RAID groups 16, the present disclosure provides hardware-assisted LBA-PBA binding and RAID group formation. FIG. 3 (described with reference to FIGS. 1 and 2) illustrates an operational flow diagram a process for host-side FTL-based RAID management with hardware-assisted LBA-PBA binding and RAID group formation according to embodiments.

Given the user data to be protected by RAID groups 16 and written to the storage devices 14, the host-side FTL module 12 does not immediately form the LBA-PBA binding. Instead, at process A1, the host-side FTL module 12 first distributes (writes) the user data to the m storage devices 14 that should store the user data for the current RAID group 16. Meanwhile, at process A2, the host-side FTL module 12 keeps the user data in its own host-side buffer memory 20. At process A3, upon receiving the user data from the host-side FTL module 12, each storage device 14 internally determines its own LBA-PBA binding in order to best streamline the internal write buffer packing and flash memory write of the storage device 14, and then sends the LBA-PBA binding results back to the host-side FTL module 12. Upon receiving the hardware-assisted LBA-PBA binding results from all of the storage devices 14 (Y at process A4), the host-side FTL module 12 will know which user data belongs to the same RAID group 16 according to their PBAs 18. Subsequently, at process A5, the host-side FTL module 12 carries out RAID encoding to generate the redundancy chunks r that should be stored in the other r storage devices 14. The redundancy chunks r must be stored in the same PBAs 18 as the user data chunks m in the same RAID group 16. Hence, at process A6, the host-side FTL module 12 can immediately determine the LBA-PBA binding for the redundancy chunks r and, at process A7, will accordingly send the redundancy chunks r and their LBA-PBA binding information to the r storage devices 14.

Figure 4:
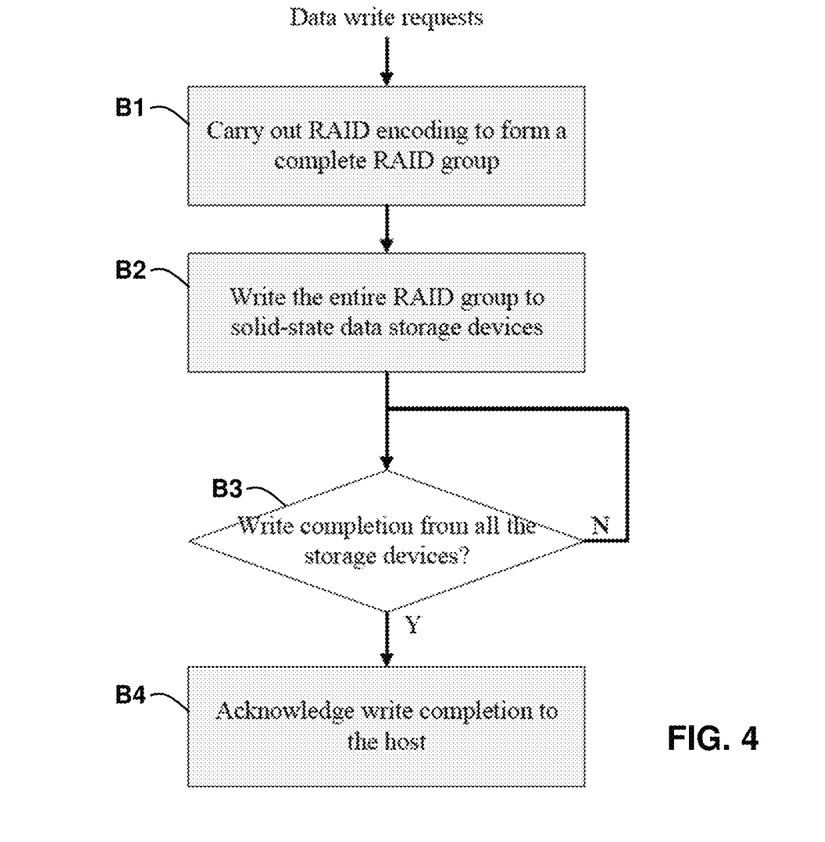
FIG. 4 illustrates an operational flow diagram of a process for acknowledging data write completion in current practice.

In conventional practice, as depicted in FIG. 4, before acknowledging the write completion of any data to the host (process B4), a RAID management module would carry out RAID encoding (process B1) to generate the entire RAID group, write the entire RAID group to the storage devices (process B2), and wait until a write acknowledge has been received from all the storage devices (process B3). This, however, results in a long write latency experienced by the host.

Figure 5:
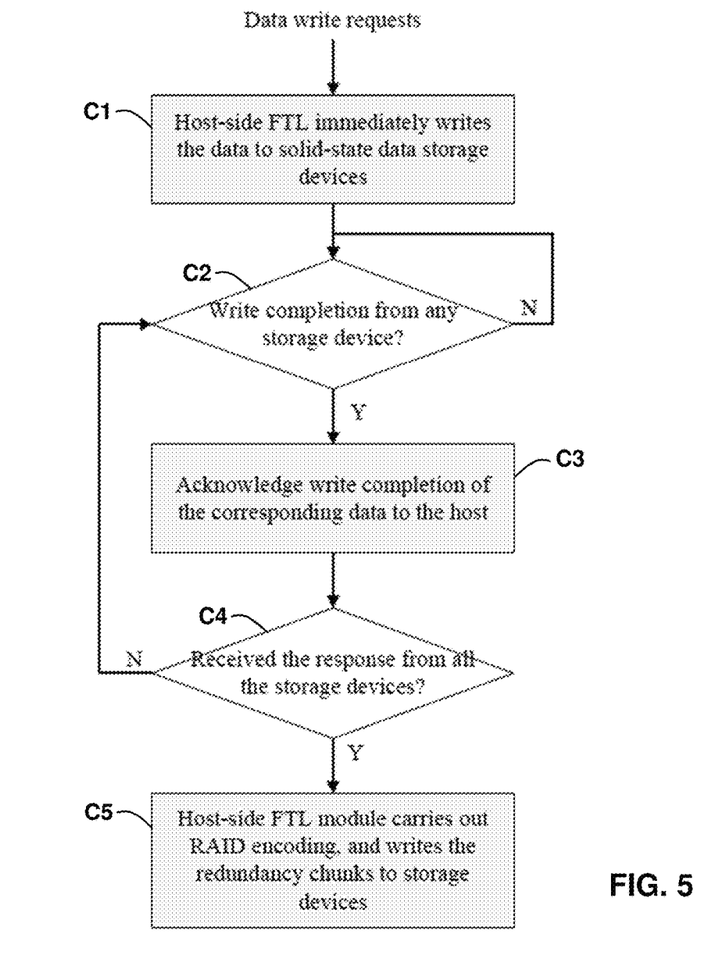
FIG. 5 illustrates an operational flow diagram of a process for reducing data write latency according to embodiments.

Leveraging the hardware-assisted LBA-PBA binding of the present disclosure, and since each storage device 14 internally includes a write buffer with power loss protection, the present disclosure presents a method to largely reduce such data write latency. An operational flow diagram of a process for reducing data write latency according to embodiments is illustrated in FIG. 5, which is described with reference to FIGS. 1 and 2. The process depicted in FIG. 5 can be incorporated as appropriate in the process for hardware-assisted LBA-PBA binding and RAID group formation described above with regard to FIG. 3.

At process C1, upon receiving data write requests, the host-side FTL module 12 immediately sends the user data to the storage devices 14. In response to receiving a write completion from a storage device 14 (Y at process C2), the host-side FTL module 12 immediately acknowledges the write completion to the host 10 at process C3. Once all of the storage devices 14 have sent back the LBA-PBA binding information to the host-side FTL module 12 (Y at process C4), the host-side FTL module 12 carries out RAID encoding to generate the redundancy chunks r and writes the redundancy chunks r to the storage devices 14 at process C5. By removing the RAID encoding from the critical write path and decoupling the write completion of user data, the write latency experienced by the host is greatly reduced.

Figure 6:
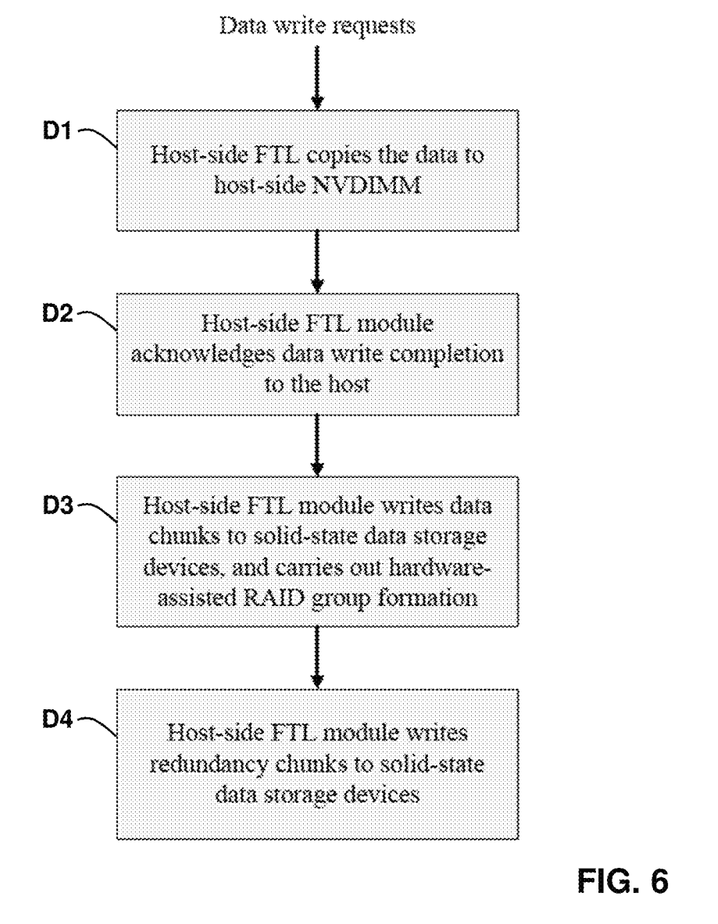
FIG. 6 illustrates an operational flow diagram of a process in which host-side FTL leverages host-side non-volatile dual in-line memory module (NVDIMM) to further reduce data write latency according to embodiments.

If the host 10 is equipped with non-volatile dual in-line memory module(s) (NVDIMM) 22 (shown in phantom in FIG. 1) or other suitable non-volatile memory, then the host-side FTL module 12 can readily leverage the host-side NVDIMM 22 to further reduce write latency. FIG. 6, which is described with reference to FIGS. 1 and 2, illustrates an operational flow diagram of a process in which the host-side FTL module 12 leverages host-side NVDIMM 22 to further reduce data write latency according to embodiments. At process D1 in FIG. 6, upon receiving data write requests, the host-side FTL module 12 first copies the data into the host-side NVDIMM 22 and then immediately acknowledges write completion to the host 10. Then, at process D2, the host-side FTL module 12 sends the user data to the storage devices 14. At process D3, once all of the storage devices 14 have sent back the LBA-PBA binding information, the host-side FTL module 12 carries out RAID encoding to generate the redundancy chunks r. At process D4, the host-side FTL module 12 writes the redundancy chunks r to the storage devices 14. The process depicted in FIG. 6 can be incorporated as appropriate in the process for hardware-assisted LBA-PBA binding and RAID group formation described above with regard to FIG. 3.

It is understood that aspects of the present disclosure may be implemented in any manner, e.g., as a software program, or an integrated circuit board or a controller card that includes a processing core, I/O and processing logic. Aspects may be implemented in hardware or software, or a combination thereof. For example, aspects of the processing logic may be implemented using field programmable gate arrays (FPGAs), ASIC devices, or other hardware-oriented system.

Aspects may be implemented with a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, etc. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

The computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by hardware and/or computer readable program instructions.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description of various aspects of the present disclosure has been presented for purposes of illustration and description. It is not intended to be exhaustive or to limit the concepts disclosed herein to the precise form disclosed, and obviously, many modifications and variations are possible. Such modifications and variations that may be apparent to an individual in the art are included within the scope of the present disclosure as defined by the accompanying claims.

The invention claimed is:

1. A method for implementing a redundant array of independent disks (RAID) group in a system including a host computing system, a first set of storage devices for storing user data for the RAID group, and a second set of storage devices for storing redundancy data for the RAID group, comprising:
   distributing the user data from a host-side flash translation layer (FTL) module on the host computing system to the first set of storage devices;
   determining, by each storage device in the first set of storage devices, a logical block address to physical block address (LBA-PBA) binding for the user data received from the host-side FTL module;
   sending LBA-PBA binding information for the LBA-PBA binding from the first set of storage devices to the host-side FTL module; and performing, by the host-side FTL module, RAID encoding to form the RAID group based on the LBA-PBA binding information received from the first set of storage devices.

2. The method according to claim 1, wherein the RAID encoding performed by the host-side FTL module further comprises generating the redundancy data for the RAID group.

3. The method according to claim 2, wherein the RAID encoding performed by the host-side FTL module further comprises determining a LBA-PBA binding for the redundancy data.

4. The method according to claim 3, wherein the RAID encoding performed by the host-side FTL module further includes sending the redundancy data and LBA-PBA binding information for the LBA-PBA binding of the redundancy data to the second set of storage devices.

5. The method according to claim 1, further comprising determining if all of the storage devices in the first set of storage devices have sent the LBA-PBA binding information to the host-side FTL module, wherein the host-side FTL module performs the RAID encoding only if all of the storage devices in the first set of storage devices have sent the LBA-PBA binding to the host-side FTL module.

6. The method according to claim 1, further comprising:
receiving, by the host-side FTL module, a write request for the user data from the host computing system; and
immediately writing the user data from the host-side FTL module to the first set of storage devices in response to the write request.

7. The method according to claim 6, further comprising:
receiving, by the host-side FTL module, a write completion from any of the storage devices in the first set of storage devices; and, in response,
immediately sending a write completion acknowledgement from the host-side FTL module to the host computing system.

8. The method according to claim 1, further comprising, prior to distributing the user data from the host-side FTL module to the first set of storage devices:
copying, by the host-side FTL module, the user data to a memory of the host-side FTL module; and
immediately sending a write acknowledgement for the user data to the host computing system.

9. A system for implementing a redundant array of independent disks (RAID) group, comprising:
a host-side flash translation layer (FTL) module on a host computing system;
a first set of storage devices for storing user data for the RAID group; and
a second set of storage devices for storing redundancy data for the RAID group;
wherein the host-side FTL module is configured to:
distribute the user data to the first set of storage devices;
receive a logical block address to physical block address (LBA-PBA) binding information for the user data determined by the first set of storage devices; and
perform RAID encoding to form the RAID group based on the LBA-PBA binding information received from the first set of storage devices.

10. The system according to claim 9, wherein the host-side FTL module is further configured to generate the redundancy data for the RAID group.

11. The system according to claim 10, wherein the host-side FTL module is further configured to determine a LBA-PBA binding for the redundancy data.

12. The system according to claim 11, wherein host-side FTL module is further configured to send the redundancy data and LBA-PBA binding information for the LBA-PBA binding of the redundancy data to the second set of storage devices.

13. The system according to claim 9, wherein the host-side FTL module is further configured to perform the RAID encoding only if the LBA-PBA binding information has been received from all of the storage devices in the first set of storage devices.

14. The system according to claim 9, wherein the host-side FTL module is further configured to:
receive a write request for the user data from the host computing system; and
immediately write the user data to the first set of storage devices in response to the write request.

15. The system according to claim 14, wherein the host-side FTL module is further configured to:
receive a write completion from any of the storage devices in the first set of storage devices; and, in response,
immediately send a write completion acknowledgement to the host computing system.

16. The system according to claim 9, wherein the host-side FTL module is further configured, prior to distributing the user data to the first set of storage devices, to:
copy the user data to a memory of the host-side FTL module; and
immediately send a write acknowledgement for the user data to the host computing system.

17. The system according to claim 9, wherein each storage device in the first set of storage devices and the second set of storage devices comprises a solid-state data storage device including flash memory.

18. A system for implementing a redundant array of independent disks (RAID) group, comprising:
a host computing system;
a flash translation layer (FLT) module on the host computing system;
a first set of solid-state data storage devices for storing user data for the RAID group; and
a second set of solid-state data storage devices for storing redundancy data for the RAID group;
wherein the FTL module is configured to:
distribute the user data to the first set of solid-state data storage devices;
receive a logical block address to physical block address (LBA-PBA) binding information for the user data from, and determined by, each solid-state data storage device in the first set of solid-state data storage devices; and
perform RAID encoding to form the RAID group based on the LBA-PBA binding information received from each solid-state data storage device in the first set of solid-state data storage devices.

19. The system according to claim 18, wherein the host-side FTL module is further configured to:
generate the redundancy data for the RAID group;
determine a LBA-PBA binding for the redundancy data; and
send the redundancy data and LBA-PBA binding information for the LBA-PBA binding of the redundancy data to the second set of storage devices.

20. The system according to claim 18, wherein the host-side FTL module is further configured to:
receive a write request for the user data from the host computing system;

immediately write the user data to the first set of storage devices in response to the write request;
receive a write completion from any of the storage devices in the first set of storage devices; and, in response,
immediately send a write completion acknowledgement to the host computing system.

\* \* \* \* \*